United States Patent
D'Amico et al.

(10) Patent No.: US 9,377,624 B2
(45) Date of Patent: Jun. 28, 2016

(54) REDUCING LIGHT DAMAGE IN SHUTTERLESS IMAGING DEVICES ACCORDING TO FUTURE USE

(71) Applicant: Google Inc., Mountain View, CA (US)

(72) Inventors: Samuel R. D'Amico, Stanford, CA (US); Xiaoyu Miao, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/695,600

(22) Filed: Apr. 24, 2015

(65) Prior Publication Data

US 2015/0226968 A1     Aug. 13, 2015

Related U.S. Application Data

(62) Division of application No. 13/894,081, filed on May 14, 2013, now Pat. No. 9,036,078.

(51) Int. Cl.
| | |
|---|---|
| *H04N 5/235* | (2006.01) |
| *H04N 5/225* | (2006.01) |
| *H04N 5/228* | (2006.01) |
| *H04N 9/73* | (2006.01) |
| *G03B 9/70* | (2006.01) |
| *G02B 27/01* | (2006.01) |
| *H04N 5/353* | (2011.01) |

(52) U.S. Cl.
CPC .............. *G02B 27/017* (2013.01); *H04N 5/353* (2013.01)

(58) Field of Classification Search
CPC ......................................................... G03B 7/16
USPC .............. 348/207.99, 222.1, 227.1, 235, 362; 396/166
See application file for complete search history.

(56) References Cited

U.S. PATENT DOCUMENTS

| | | | |
|---|---|---|---|
| 3,586,773 A | 6/1971 | Niemyer, Jr. et al. | |
| 5,406,348 A * | 4/1995 | Wheeler | G03B 7/097 396/166 |
| 6,297,918 B1 | 10/2001 | Justus et al. | |
| 7,123,215 B2 | 10/2006 | Nakada | |
| 7,180,045 B2 | 2/2007 | Anderson | |
| 2002/0122247 A1* | 9/2002 | Smith | A61B 3/13 359/385 |
| 2012/0244812 A1 | 9/2012 | Rosener | |

* cited by examiner

*Primary Examiner* — Joel Fosselman

(74) *Attorney, Agent, or Firm* — Blakely Sokoloff Taylor & Zafman LLP

(57) ABSTRACT

Reducing light damage in a shutterless imaging device includes receiving a signal from a hardware device and analyzing the signal to predict a use demand of the shutterless imaging device. In response to the analysis of the signal from the hardware device, a lens of the shutterless imaging device is adjusted. Adjusting the lens spreads out energy of far-field image light incident on an image sensor of the shutterless imaging device.

8 Claims, 6 Drawing Sheets

REDUCING LIGHT DAMAGE IN SHUTTERLESS IMAGING DEVICES ACCORDING TO FUTURE USE

CROSS-REFERENCE TO RELATED APPLICATIONS

This application is a divisional of U.S. patent application Ser. No. 13/894,081, filed on May 14, 2013, now pending. U.S. patent application Ser. No. 13/894,081 is hereby incorporated by reference.

TECHNICAL FIELD

This disclosure relates generally to optics, and in particular but not exclusively, relates to protecting image sensors from light damage.

BACKGROUND INFORMATION

Conventional digital imaging devices or cameras have a lens (which may include multiple lens elements) that focuses image light onto an image sensor that measures the image light and generates an image based on the measurements. FIG. 1 illustrates a common configuration for a digital imaging device 100. FIG. 1 includes an image sensor 101 including optical efficiency lenses 110 disposed over photosensitive substrate 103. Optical efficiency lenses 110 function to draw as much light as possible into the pixels for measurement. Optical efficiency lenses 110 may be microlenses disposed over each pixel of image sensor 101. An infrared ("IR") filter 115 may be disposed over optical efficiency lenses 110 to filter out IR light from being measured by image sensor 101. Color filters 107 may filter out certain colors of light so that each pixel only receives one color of light. For example, color filter 107 may include a Bayer pattern that allows four neighboring pixels to receive red, green, green, and blue light, respectively.

Lens 120 is disposed over image sensor 101 to focus image light 199 onto the pixels of image sensor 101. Lens 120 may include convex and/or concave lens elements 123 that give lens 120 a certain focal length or lengths. Lens 120 may include an autofocus module 127 that moves at least some lens elements 123 in the z-axis 121 in order to focus image light 199 onto image sensor 101.

Often times, digital cameras are integrated into mobile devices. Currently, a large percentage of digital cameras that are integrated into mobile devices may not have a physical shutter but instead rely on electronic shutters (e.g. global shutters or rolling shutters) to control the "exposure" of the pixels in an image sensor. Therefore, without a physical shutter shielding the image sensor, ambient light may be incident on the image sensors of digital cameras for long periods of time, which can damage the digital camera.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an apparatus and method for protecting a shutterless imaging device from light damage are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
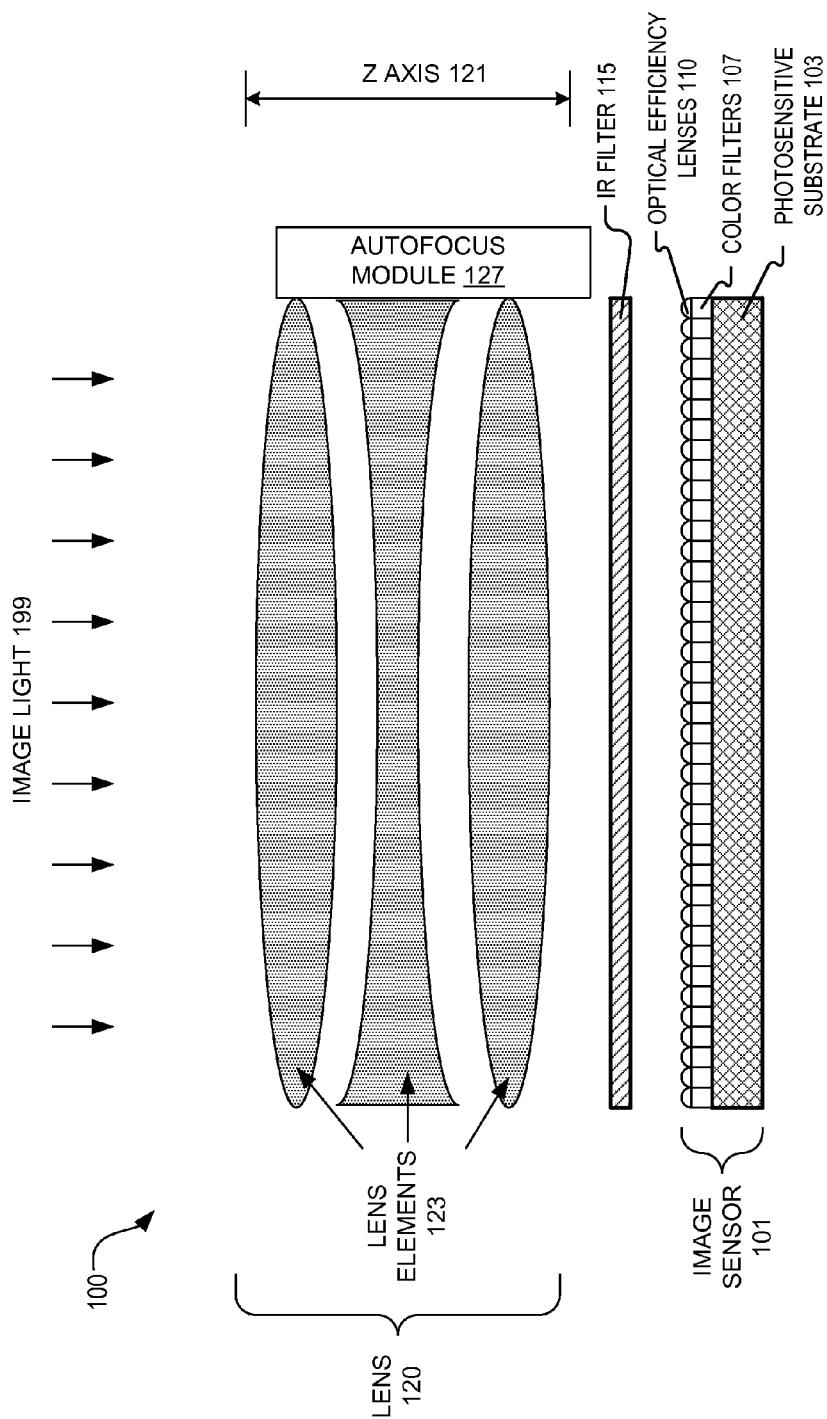
FIG. 1 illustrates a common configuration for a digital imaging device.

FIG. 1 illustrates one example of a common configuration for a digital imaging device 100. As mentioned above, digital cameras that don't have a physical shutter may have their image sensors exposed to ambient light for long periods of time. For the purposes of this disclosure, a "shutterless imaging device" will refer to an imaging device that does not have a mechanical shutter to control image exposure. Instead, a "shutterless imaging device" will refer to an imaging device having an image sensor that is generally be exposed to ambient light and relies on electronic shutters (e.g. global or rolling) to capture an image.

In shutterless imaging devices, ambient light may be focused by lens 120 on only a small portion of the image sensor 101. The radiation energy from this beam of light focused by lens 120 on a small portion of the image sensor 101 may lead to "burn-in" degradation of components of the digital camera 100 or the image sensor 101, and the degradation can be noticed in artifacts in digital images captured by the digital camera. Shutterless imaging devices with low f-stop (corresponding with larger apertures that lets in more light) may be especially susceptible to light damage.

Experiments and testing has shown noticeable adverse effects on images captured by digital cameras that have image sensors that have been exposed to certain kinds of ambient/image light for periods of time measured in minutes (although in some cases it may take hours of exposure to damage the camera). The adverse effects may be caused because the light focused by lens 120 creates concentrated thermal energy that can damage the imaging device. For example, thermal energy may heat color filters 107 such that the optical properties of the color filters 107 are impacted by the heat. Other negative effects of concentrated image light 199 within imaging device 100 are also possible.

Figure 2:
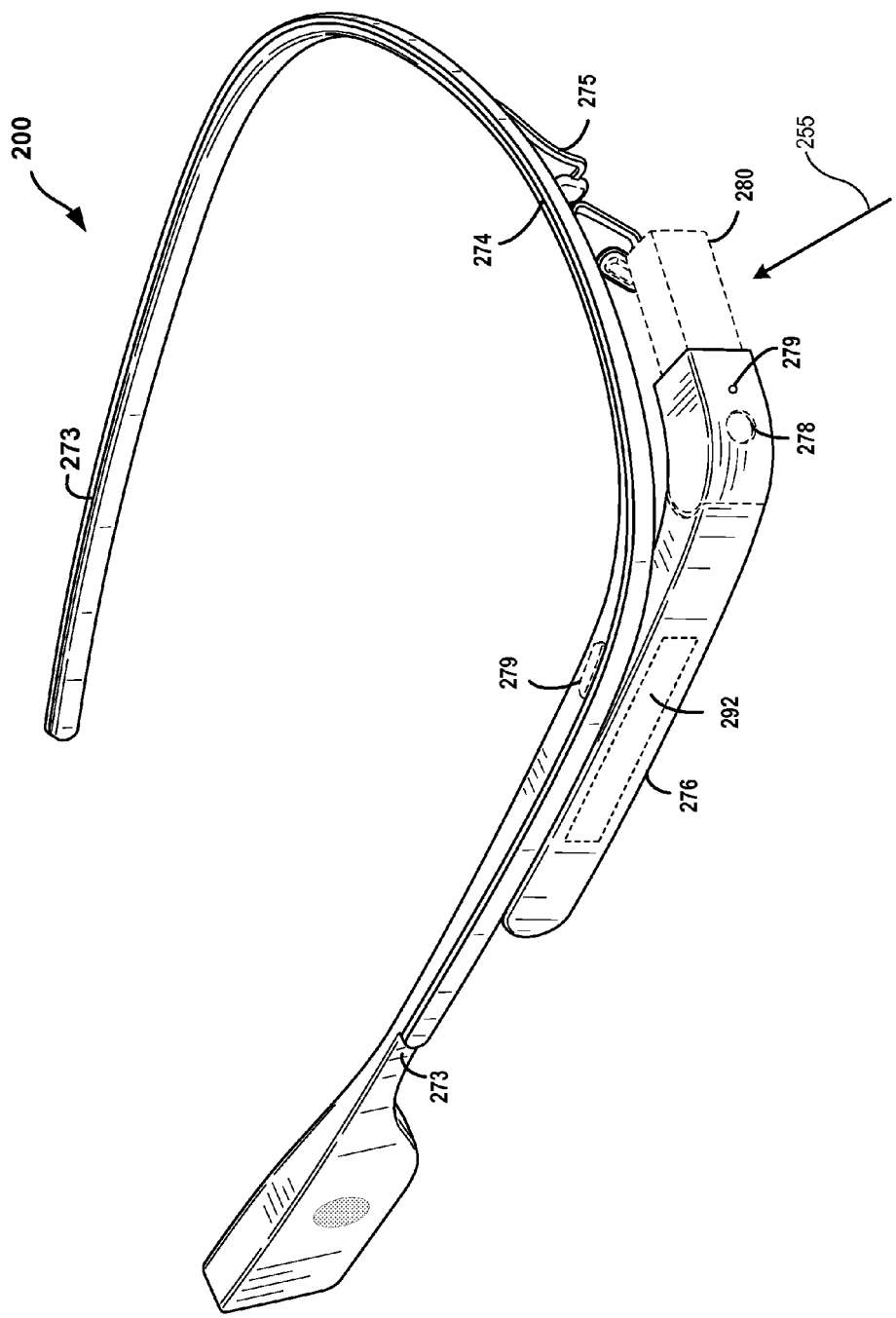
FIG. 2 illustrates an example of a head mounted display ("HMD"), in accordance with an embodiment of the disclosure.

FIG. 2 illustrates an example of a head mounted display ("HMD"), in accordance with an embodiment of the disclosure. HMD 200 includes may include a forward facing shutterless imaging device 278 and an ambient light sensor 279 positioned to measure light in-line with shutterless imaging device 278. HMD 200 is one example of a mobile device that could benefit from embodiments of this disclosure.

Example HMD 200 is a monocular HMD. HMD 200 includes side-arms 273, a center frame support 274, and a bridge portion with nosepiece 275. In the example embodiment shown in FIG. 2, center frame support 274 connects the side-arms 273. An HMD is a display device worn on or about the head. Although FIG. 2 illustrates a specific monocular HMD 200, embodiments of the present invention are applicable to a wide variety of frame types and styles (e.g. visor, headband, goggles).

The illustrated embodiment of HMD 200 is capable of displaying an augmented reality to the user. Eyepiece 280 may permit the user to see a real world image via external scene light 255 in additional to display light (having computer generated images) generated by a display module. As a result, the display light may be seen by the user as a virtual image superimposed over the real world as an augmented reality.

HMD 200 may additionally include a component housing 276, which may include an on-board computing system (not shown). Button 279 may be used to operate shutterless imaging device 278 and/or be usable for other input purposes. Touch sensitive area 292 may also be used as an input for user interaction with logic circuitry within component housing 276. Component housing 276 may also include other electrical components and/or may be electrically connected to electrical components at other locations within or on the HMD. Component housing 276 may include light sources (not shown) for a display module that sends computer generated image light toward eyepiece 280 and/or optical elements (not shown) to direct light from the light sources to the eyepiece 280. As such, eyepiece 280 may include optical features that direct light that is generated by such light sources towards the wearer's eye, when HMD 200 is being worn.

Since HMD 200 may be worn on the head of a user for extended periods of time, HMD 200 may have significant exposure to light (e.g. sunlight) that could potentially damage shutterless imaging device 278. Of course, a smartphone or tablet that includes a shutterless imaging device may also be damaged if it is exposed to damaging light for extended periods of time.

To protect a shutterless imaging device from light damage, a variety of mitigating measures can be taken. Since a likely emitter of damaging light is the sun, actions can be taken to reduce the concentration of sunlight onto a small area (e.g. 10-20 pixels) of an image sensor. Reducing the concentration of sunlight spreads out energy from damaging sunlight to a wider surface area of the image sensor, which will help dissipate the thermal energy or other harmful radiation over a wider area. This approach is beneficial in at least two respects. First, spreading the energy to a wider surface area can prevent damage by preventing a localized increase in temperature from ever compromising the optical characteristics of the image sensor. Second, if there is any damage, spreading the energy to a wider surface area of the image sensor will soften any "burn-in" line to make any artifact in an image unnoticeable, or at least less noticeable.

Figure 4:
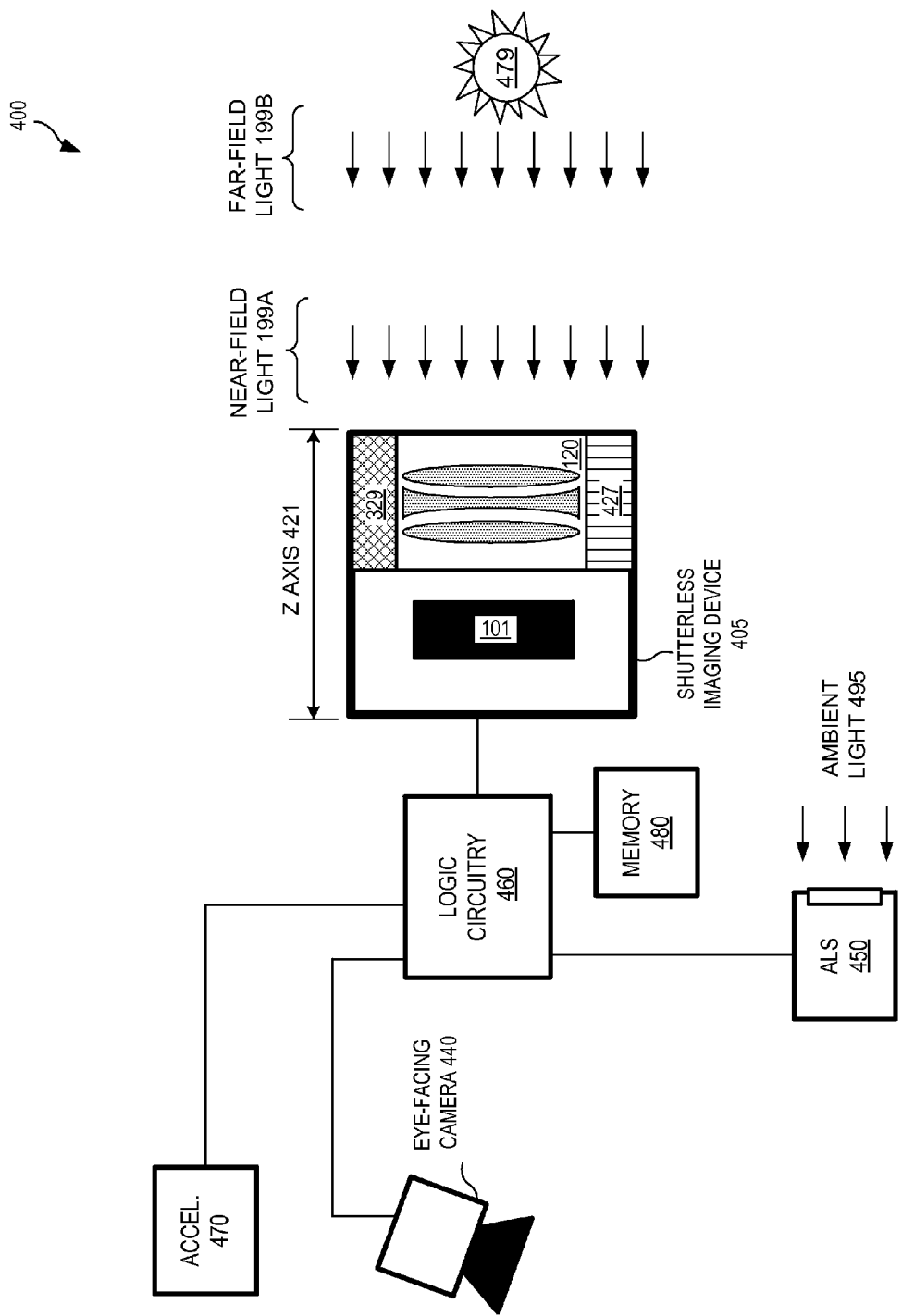
FIG. 4 illustrates a hardware system that includes a shutterless imaging device, in accordance with an embodiment of the disclosure.

FIG. 4 illustrates a hardware system 400 that can be utilized to reduce light damage in shutterless imaging device 405, in accordance with an embodiment of the disclosure. Hardware system 400 includes logic circuitry 460 which is coupled to control shutterless imaging device 405. In the illustrated embodiment, shutterless imaging device 405 includes an image sensor 101, lens 120, an autofocus module 427, and an image stabilization module 329. Hardware system 400 may also include an accelerometer 470 coupled to send a signal representative of an acceleration value to logic circuitry 460. The acceleration value may be an acceleration measurement of a hardware device that includes hardware system 400. Hardware system 400 may also include an eye-facing camera 440 facing an eye-ward direction. Eye-ward facing camera 440 is coupled to send image data (of an eye) to logic circuitry 460. Hardware system 400 further includes ambient light sensor ("ALS") 450. Logic circuitry 460 may receive a signal representative of a light level of ambient light 495 from ambient light sensor ("ALS") 450.

Logic circuitry 460 may include a processor, a Field Programmable Gate Array ("FPGA"), or other logic circuits. In the illustrated embodiment, logic circuitry 460 is coupled to memory 480, which may store instructions for logic circuitry 460 to execute. Memory 480 may also be used to store data including image data. Logic circuitry 460 may also include on-board memory to store settings, images, and image data received from shutterless imaging device 405. Logic circuitry 460 may be included in a component housing (e.g. component housing 276) of an HMD.

Figure 5:
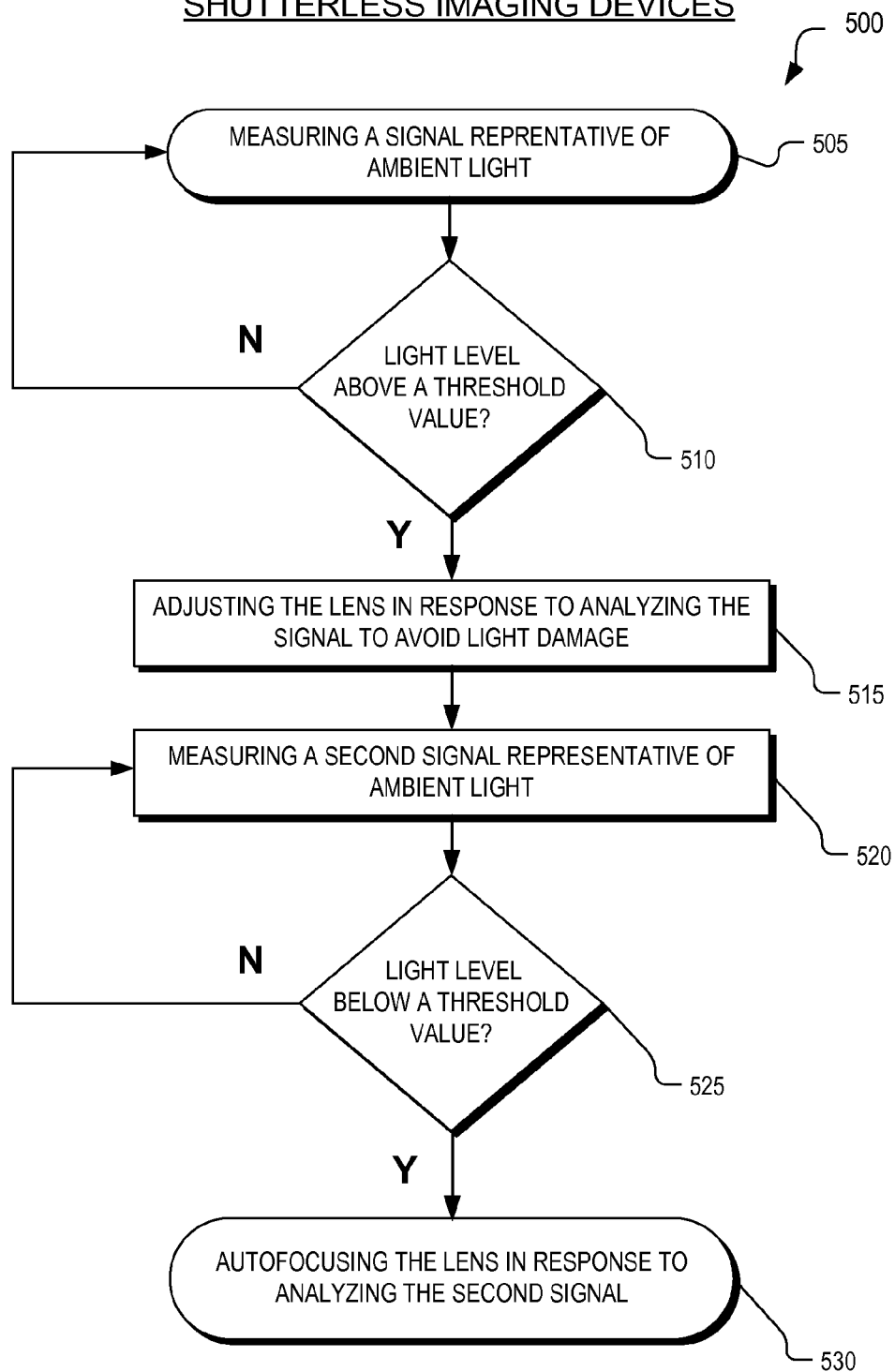
FIG. 5 shows a flow chart illustrating a method of reducing light damage in shutterless imaging devices, in accordance with an embodiment of the disclosure.

FIG. 5 shows a flow chart illustrating a method 500 of reducing light damage in shutterless imaging devices, in accordance with an embodiment of the disclosure. The order in which some or all of the process blocks appear in method 500 should not be deemed limiting. Rather, one of ordinary skill in the art having the benefit of the present disclosure will understand that some of the process blocks may be executed in a variety of orders not illustrated, or even in parallel.

In process block 505, a signal representative of a light level of ambient light is measured. In FIG. 4, logic circuitry 460 may measure a signal representative a light level of ambient light 495 from ambient light sensor ("ALS") 450 or logic circuitry could measure image data from image sensor 405 that is representative of ambient light (which may include image light 199). In one embodiment, shutterless image device 405 is an example of shutterless imaging device 278 and ALS 450 is an example of ALS 279. ALS 450 may be positioned in-line with shutterless imaging device 405. Consequently, ALS 450 and shutterless imaging device 405 may have a very similar perspective of far-field image light 199B.

In process block 510, the signal (representative of a light level of ambient light) is analyzed by logic circuitry 460 to determine if the light level is above a threshold value. The threshold value can be pre-determined by designers and stored in memory 480. The threshold value may represent a light level that is potentially harmful to shutterless imaging device 405. If the light level is below a threshold value, the process may return to process block 505. If the light level is above a threshold value, logic circuitry may command/control shutterless imaging device 405 to adjust lens 120 to prevent damage to shutterless imaging device 405 (process block 515) by spreading out energy of far-field image light 199B that is incident on image sensor 101. When a light level is above the threshold value, it is an indicator that lens 120 may be focusing damaging light onto image sensor 101. For example shutterless imaging device 405 may be facing sun 479. The reason for the concern about spreading out far-field image light 199B is because the primary damaging light source is anticipated to be the sun 479.

In one embodiment, the energy from far-field light 199B is spread out to avoid causing damage by defocusing the far-field image light 199B to increase a surface area of image sensor 101 that a damaging portion (e.g. the portion of far-field light 199B that is from a damaging light source) is incident on. Since focusing sun 479 on image sensor 101 would be accomplished by adjusting lens 120 to optical infinity (essentially infinity), control circuitry 460 may control shutterless imaging device 405 to adjust lens 120 to macro mode (e.g. adjusting lens 120 to focus near-field image light 199A onto image sensor 120). Near-field image light 199A may include ambient light within 1 meter of the shutterless imaging device 405, whereas far-field image light 199B may include ambient light that is greater than 10 meters from shutterless imaging device 405. Adjusting lens 120 to focus near-field image light 199A onto image sensor 101 effectively increases the surface area over image sensor 101 that is subjected to the harmful sunlight included in far-field image light 199B because the far-field image light 199B will come to a focal point behind the image sensor. Thus, the energy of the far-field image light 199B will not be concentrated on the face of image sensor 101. Adjusting lens 120 to focus near-field image light 199A onto image sensor 101 may include bringing at least some lens elements of lens 120 closer to image sensor 101 along z-axis 421. Control circuitry 460 may cause autofocus module 427 to adjust lens 120 to its closest focusing configuration to focus near-field image light 199A onto image sensor 101.

In one embodiment, the energy from far-field light 199B is spread out to avoid causing damage by moving lens 120 within a plane that is substantially parallel to a face of image sensor 101. This will distribute a beam of light (from sun 479, as an example) and its energy, over time, into different portions of image sensor 101, rather than have that beam of light statically "burn-in" a given portion of the image sensor.

Figure 3A:
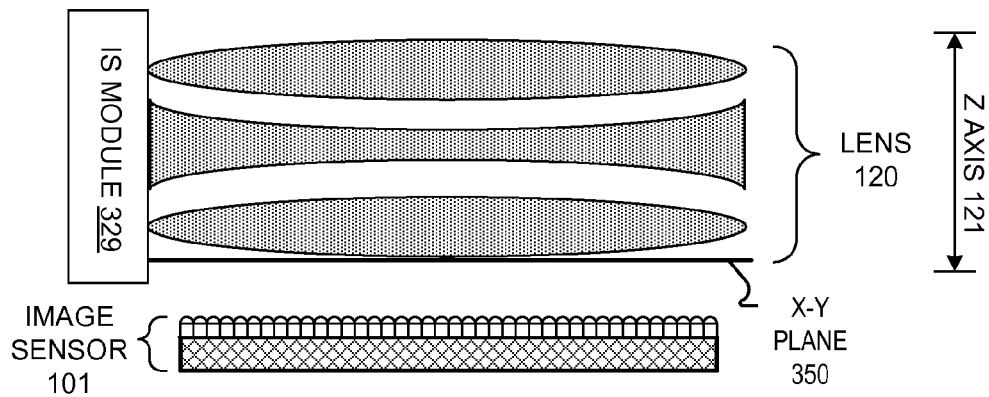
FIGS. 3A and 3B illustrate a relationship between an image sensor, a lens, and an image stabilization module, in accordance with an embodiment of the disclosure.
Figure 3B:
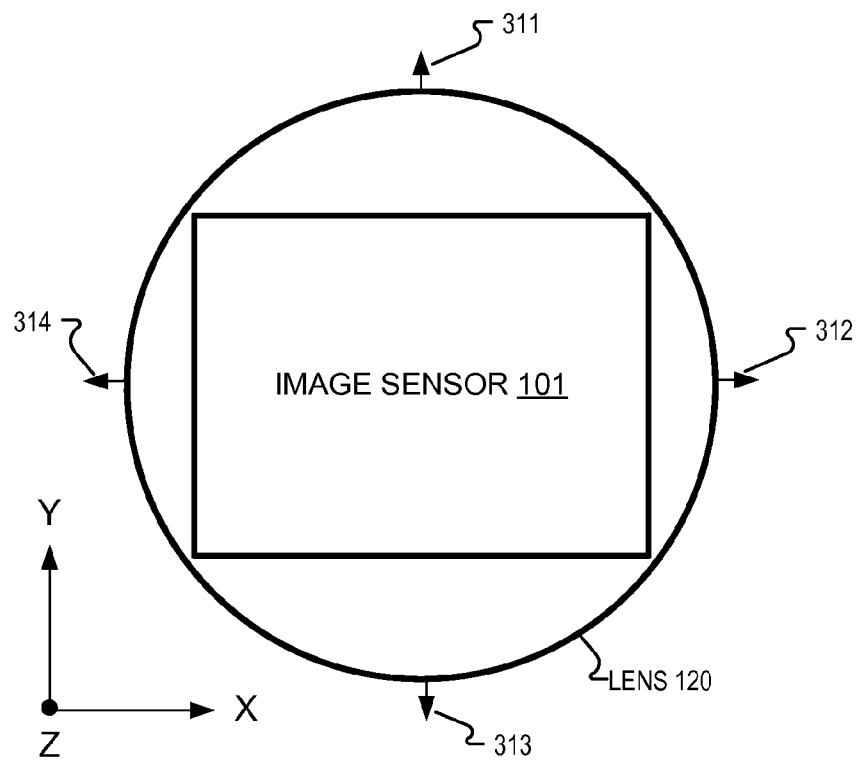

FIGS. 3A and 3B illustrate a relationship between image sensor 101, lens 120, and an image stabilization module 329 as lens 120 is moved within an x-y plane 350 that is substantially parallel with the face of image sensor 101, in accordance with an embodiment of the disclosure. In FIG. 3A, image stabilization module 329 is coupled to lens 120 to move lens 120 in x-y plane 350. Image stabilization modules are often coupled to (or included in) an accelerometer so that it can coordinate the movement of the lens 120 in x-y plane 350 to the movement of the imaging device to facilitate image stabilization. As shown in FIG. 3B, image stabilization module 329 can cause lens 120 to move in directions 311, 312, 313, and 314 that are within x-y plane 350. Here, that same functionality can be utilized to distribute a beam of a potentially harmful light source (e.g. sun 479) to different areas of the image sensor 101, as a way to spread out (over time) energy from far-field image light 199B.

Moving lens 120 in the x-y plane 350 may be combined with adjusting lens 120 to focus near-field image light 199A onto image sensor 101 as a viable method of protecting image sensor 101 from light damage.

Returning to FIG. 5, method 500 may continue from process block 515 to process block 520, where a second signal representative of a light level of ambient light is measured by logic circuitry 460. The second signal can then be analyzed to determine if a light level of ambient light has fallen below the threshold value (meaning the light will not likely damage shutterless imaging device 405). If the light level has not fallen below the threshold value, method 500 returns to process block 520. If the light level has fallen below the threshold value, method 500 continues to process block 530 and logic circuitry 460 may instruct shutterless imaging device 405 to allow lens 120 to be autofocused by autofocus module 427.

Figure 6:
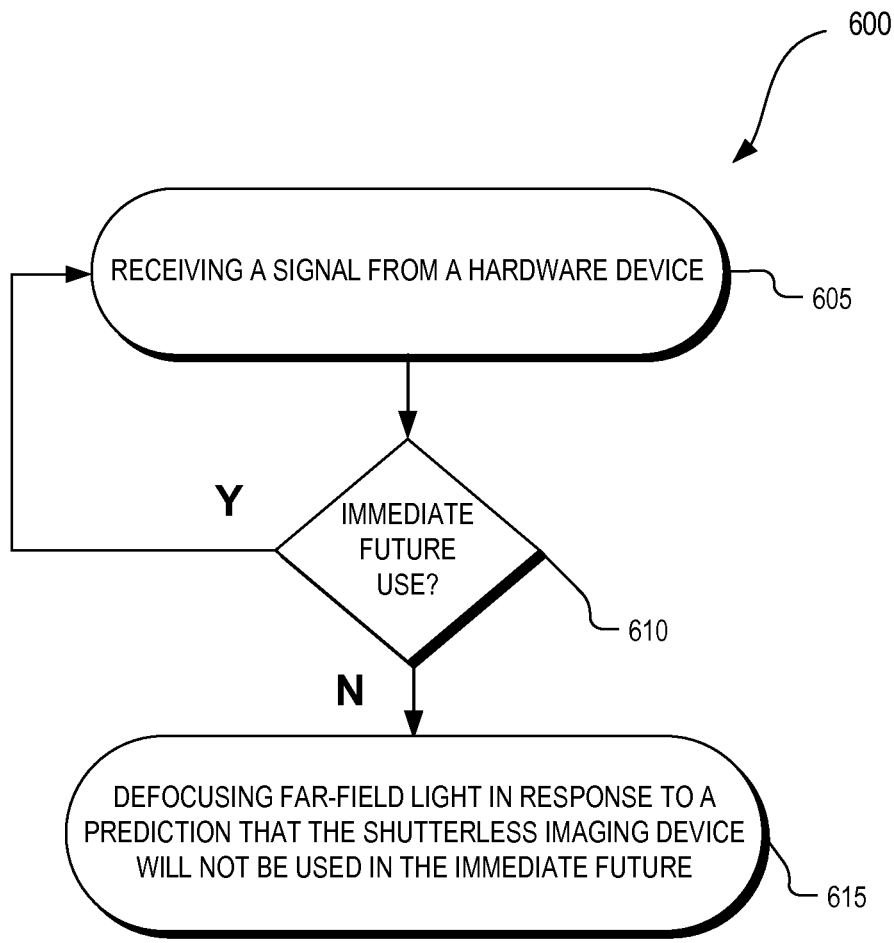
FIG. 6 shows a flow chart illustrating a method of reducing light damage in shutterless imaging devices, in accordance with an embodiment of the disclosure.

FIG. 6 shows a flow chart illustrating a method 600 of protecting a shutterless imaging device from light damage, in accordance with an embodiment of the disclosure. The order in which some or all of the process blocks appear in method 600 should not be deemed limiting. Rather, one of ordinary skill in the art having the benefit of the present disclosure will understand that some of the process blocks may be executed in a variety of orders not illustrated, or even in parallel.

In process block 605, a signal from a hardware device is received. If the hardware device is an HMD, the signal may indicate whether the HMD is being worn. This may be referred to as a Don/Doff detection. If the hardware device is a smartphone or a tablet, the signal may indicate whether the smartphone or tablet is being used.

In FIG. 4, logic circuitry 460 may receive a signal (e.g. image data) from eye-facing camera 440 or from accelerometer 470. Image data received from eye-facing camera 440 may include images of an eye of a wearer of HMD 200. Eye-facing camera 440 may be positioned on HMD 200 to face an eye-ward direction where a user's eye is located when HMD 200 is worn. Logic circuitry 460 may also receive a signal from accelerometer 470 that is representative of an acceleration of the hardware device.

In process block 610, the signal is analyzed (by logic circuitry 460) to predict a use demand (whether shutterless imaging device 405 will be used in the immediate future) of shutterless imaging device 405. If logic circuitry 460 predicts that shutterless imaging device 405 will be utilized in the near term, the method 600 may return to process block 605. If logic circuitry 460 predicts that shutterless imaging device 405 will not be utilized in the near term, process 600 may continue to process block 615.

Logic circuitry 460 may make its "prediction" according to an algorithm. For example, if logic circuitry 460 analyzes image data from eye-facing camera 440 and an eye is not present in the image data, there is a high likelihood that HMD is not being worn, and thus it is not being used. If it is not being used, there is a decreased likelihood that shutterless imaging device 405 will be utilized in the immediate future. Therefore, logic circuitry 460 may predict that shutterless imaging device 405 will not be used in the near term. In another example, logic circuitry 460 analyzes data from accelerometer 470 and if there is no acceleration in the data, there is a higher likelihood that the HMD, smartphone, or tablet is not moving, and thus it is not being used. If it is not being used, there is a decreased likelihood that shutterless imaging device 405 will be utilized in the immediate future. Therefore, logic circuitry 460 may predict that shutterless imaging device 405 will not be used in the near term. In one example, the signal analyzed by logic circuitry 460 is an indicator that the hardware device is in a reduced processing state (e.g. sleep mode), and therefore, shutterless imaging device 405 is unlikely to be used in near term.

It is appreciated that logic circuitry 460 may use a variety of other data and even combine various data to make a use demand prediction for shutterless imaging device 405. For example, other user interaction with the hardware device may indicate that the device is in use and increase the likelihood that shutterless imaging device 405 will be utilized.

If it is predicted that shutterless imaging device 405 will not be utilized in the immediate future, logic circuitry 460 may control shutterless imaging device 405 to adjust lens 120 to protect image sensor 101 in the various ways discussed above. For example shutterless imaging device 405 may control lens 120 to defocus far-field image light 199B onto image sensor 101 as a way to avoid "burn-in" by sun 479 (process block 615). Or, the lens can be adjusted in x-y plane 350 to spread out the energy over a larger surface area of image sensor 101. Of course, both of these methods could be combined (performed in parallel) to protect image sensor 101 from light damage.

In one embodiment, autofocus module 427 is configured to default to a "macro" focusing position (focusing near-field image light 199A) when shutterless imaging device 405 or a mobile device that includes shutterless imaging device 405 is powered down or is in a reduced processing state. Defaulting to a macro focusing position reduces or eliminates electrical power consumption required to keep lens 120 focusing near-field image light 199 onto image sensor 101, thereby avoiding focusing potentially harmful far-field light 199B onto image sensor 101. In one embodiment, a spring-return position of an actuator in autofocus module 427 causes lens 120 to return to the macro focusing position upon powering down. In one embodiment, an actuator in autofocus module 427 is configured to be bistable, meaning that electrical power is not required to keep lens 120 in the macro focusing position or in an infinity focusing position (focusing far-field image light 199B).

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A hardware device comprising:
a shutterless imaging device including an image sensor and a lens;
logic circuitry coupled to control the shutterless imaging device; and
a non-transitory machine-accessible storage medium that provides instructions that, when executed by the hardware device, will cause the hardware device to perform operations comprising:
receiving a signal from the hardware device;
analyzing the signal with the logic circuitry to predict a use demand of the shutterless imaging device; and
adjusting a lens of the shutterless imaging device in response to predicting that the use demand is not immediate, wherein adjusting the lens of the shutterless imaging device positions the lens to defocus far-field image light propagating toward an image sensor of the shutterless imaging device to increase a surface area of the image sensor that any damaging portion of the far-field image light is incident on.

2. The hardware device of claim 1, wherein the hardware device is a head mounted display ("HMD"), and wherein the signal indicates whether the HMD is being worn on the head of a user.

3. The hardware device of claim 2 further comprising: an accelerometer coupled to send the signal to the logic circuitry, wherein the signal is representative of an acceleration of the hardware device.

4. The hardware device of claim 2, further comprising: an eye-facing camera facing an eye-ward direction of the HMD, wherein the eye-facing camera is coupled to send the signal to the logic circuitry.

5. The hardware device of claim 1, wherein the hardware device is a head mounted display ("HMD"), and wherein the signal indicates whether the HMD is in a reduced processing state.

6. A method of reducing light damage in a shutterless imaging device, the method comprising:
receiving a signal from a hardware device;
analyzing the signal to predict if the shutterless imaging device will be used in the immediate future; and
adjusting a lens of the shutterless imaging device in response to predicting that the shutterless imaging device will not be used in the immediate future, wherein adjusting the lens of the shutterless imaging device includes defocusing far-field image light that is incident on an image sensor of the shutterless imaging device to increase a surface area of the image sensor that any damaging portion of the far-field image light is incident on.

7. The method of claim 6, wherein the hardware device is a head mounted display ("HMD"), and wherein the signal indicates whether the HMD is being worn on the head of a user.

8. The method of claim 6, wherein the hardware device is a head mounted display ("HMD"), and wherein the signal indicates whether the HMD is in a reduced processing state.

* * * * *